(12) United States Patent
Kim et al.

(10) Patent No.: US 9,555,329 B2
(45) Date of Patent: Jan. 31, 2017

(54) MULTI-ACCESS ONLINE GAME SYSTEM AND METHOD FOR CONTROLLING GAME FOR USE IN THE MULTI-ACCESS ONLINE GAME SYSTEM

(75) Inventors: Seonghun Kim, Seoul (KR); Hyojoon Kim, Yongin-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 1071 days.

(21) Appl. No.: 11/853,525

(22) Filed: Sep. 11, 2007

(65) Prior Publication Data

US 2008/0070696 A1    Mar. 20, 2008

(30) Foreign Application Priority Data

Sep. 15, 2006  (KR) .................. 10-2006-0089753

(51) Int. Cl.
```
A63F 9/24       (2006.01)
A63F 13/358     (2014.01)
A63F 13/352     (2014.01)
A63F 13/30      (2014.01)
H04L 29/06      (2006.01)
A63F 13/87      (2014.01)
```

(52) U.S. Cl.
CPC ............ *A63F 13/358* (2014.09); *A63F 13/12* (2013.01); *A63F 13/352* (2014.09); *H04L 67/38* (2013.01); *A63F 13/87* (2014.09); *A63F 2300/513* (2013.01); *A63F 2300/534* (2013.01)

(58) Field of Classification Search
CPC ............. A63F 13/352; A63F 2300/534; A63F 2300/513

USPC .......................................... 463/42
See application file for complete search history.

(56) References Cited

U.S. PATENT DOCUMENTS

| | | | |
|---|---|---|---|
| 6,015,348 A * | 1/2000 | Lambright et al. | 463/42 |
| 2003/0177187 A1* | 9/2003 | Levine et al. | 709/205 |
| 2005/0164793 A1* | 7/2005 | Merimovich et al. | 463/42 |
| 2006/0258462 A1* | 11/2006 | Cheng et al. | 463/42 |
| 2007/0117631 A1* | 5/2007 | Lim et al. | 463/42 |
| 2007/0184904 A1* | 8/2007 | Lee | 463/42 |
| 2008/0016236 A1* | 1/2008 | Beverly et al. | 709/230 |

FOREIGN PATENT DOCUMENTS

WO    WO 2005076189 A1 *   8/2005

* cited by examiner

*Primary Examiner* — Dmitry Suhol
*Assistant Examiner* — David Duffy
(74) *Attorney, Agent, or Firm* — H.C. Park & Associates, PLC (57) ABSTRACT

A multi-access online game system and a game control method for use in the same are disclosed. The game control method is applied to a multi-access online game system which is connected to at least one user client and includes a first server and at least one second server. The method includes: receiving an event message associated with a game from a first user client, wherein the first server receives the game-associated event message when the game-associated event message is not the real-time message, and the at least one second server receive the game-associated event message when the game-associated event message is the real-time message; determining a second user client where the real-time message is to be received; and transmitting the real-time message to the second user client. The real-time message is processed by the second server, so that the load of the first server is reduced.

15 Claims, 8 Drawing Sheets

MULTI-ACCESS ONLINE GAME SYSTEM AND METHOD FOR CONTROLLING GAME FOR USE IN THE MULTI-ACCESS ONLINE GAME SYSTEM

CROSS-REFERENCE TO RELATED APPLICATION

This application claims the benefit of Korean Patent Application No. 10-2006-0089753, filed on Sep. 15, 2006, which is hereby incorporated by reference as if fully set forth herein.

BACKGROUND

Field of Invention

The present invention relates to a multi-access online game system and a method for controlling a game for use in the multi-access online game system, and more particularly to a system and method for effectively processing real-time messages generated during an online game with many messages to be processed in real time.

Description of the Related Art

Recently, with the increasing development of network technologies, data can be transmitted to a desired destination at high speed. As user terminals capable of accessing the network have rapidly come into widespread use throughout the world, content providers (CPs) capable of providing the user terminals with a variety of contents are rapidly increasing every year.

The content provider (CP) provides users with a variety of content services, for example, a searching service, a shopping service, a game service, and a chatting service, etc. Particularly, if the game service acting as the paying service is provided to the users, the content provider (CP) can guarantee a large number of consumers, so that the game service is generally considered to be the most important content service profitable to the content provider (CP).

Particularly, a multi-access online role-playing game from among many online games enables a plurality of gamers to use or modify environments provided from game developers, so that the gamers can create stories and structures of games. In this way, it should be noted that the above-mentioned multi-access online role-playing games are considered to be a representative specified game.

There are a variety of multi-access online role-playing games, for example, "Diablo" and "World of Warcraft" from Blizzard, "Lineage" from NCsoft, and "Ultima Online" from ORIGIN, etc.

Generally, the above-mentioned multi-access online role-playing game has provided users with a fantasy-based world (i.e., simulated environments). However, in recent times, the world of the multi-access online role-playing game has become more diverse in the real world, for example, general cities or schools.

The multi-access online role-playing game has been conducted by interaction between one player and other players, so that a game command message of any one of the users must be transmitted to other users. The transmission of the game command message greatly affects a load of the multi-access online role-playing game server.

With the extension of the multi-access online role-playing game area, a racing game is modified into the multi-access online role-playing game, and is then provided to users or players. Player characters (e.g., cars) for use in the above-mentioned racing role-playing game move very fast or frequently collide with each other. Therefore, if the fast-moving information or collision information of the player characters is transmitted to users other than a playing user, an amount of load of the game server may be rapidly increased, resulting in the occurrence of fatal errors.

SUMMARY

One embodiment exemplarily described herein can be generally characterized as providing a multi-access online game system for effectively processing game-associated messages for use in a multi-access online game, and a game control method for use in the multi-access online game system.

Another embodiment exemplarily described herein can be generally characterized as providing a multi-access online game system for processing messages caused by events between players in different ways, so that it can reduce an amount of load of a game server, and a game control method for use in the multi-access online game system.

Yet another embodiment exemplarily described herein can be generally characterized as providing a multi-access online game system for selectively determining an object where messages are received according to message categories, so that it can reduce an amount of server load created during the message transmission, and a game control method for use in the multi-access online game system.

Effects of the aforementioned embodiments can be accomplished by providing a game control method for use in a multi-access online game system which is connected to at least one user client and includes a first server and at least one second server. The method may include: receiving an event message associated with a game from a first user client, wherein the first server receives the game-associated event message when the game-associated event message is not a real-time message, and the at least one second server receives the game-associated event message when the game-associated event message is the real-time message; determining a second user client where the real-time message is to be received; and transmitting the real-time message to the second user client.

In one embodiment, there is provided a game control method for employing a game application installed into at least one user client who gains access to a multi-access online game system including a first server and at least one second server to play a game. The method may include: receiving game command information from a user, determining whether an event created by the received game command is a real-time event; when the event is the real-time event, generating a real-time message, and transmitting the generated real-time message to any one of the at least one second server; and when the event is not the real-time event, transmitting a message associated with the event to a game server, wherein the real-time message is transmitted to a game application of a user client decided by the at least one second server.

In another embodiment, there is provided a computer-readable recording medium storing a program for executing the above-mentioned method.

In yet another embodiment there is provided a multi-access online game system for controlling a game of player characters corresponding to a plurality of user clients. The game system may include: a game server for receiving event messages associated with a game from a first user client, and processing the received game-associated event messages according to a predetermined game logic; a database (DB) server for receiving status change information including status change information of each player character from the game server, and storing the received status change information in a database (DB); and at least one distributed server for receiving a real-time message among the game-associated event messages from the first user client, determining a second user client where the real-time message is to be received, and transmitting the real-time message to the second user client.

In yet another embodiment, there is provided a recording medium equipped with a game application installed in at least one user client which gains access to a multi-access online game system including a first server and at least one second server to play a game. The recording medium may include: a command interpreter for interpreting game command information inputted by a user; an event decision unit for determining whether an event created by the command is contained in a predetermined real-time event, so that it can determine whether the event is the real-time event or a non-real-time event; a game logic processor for executing a predetermined game logic according to the interpreted result of the command interpreter, and generating game messages associated with the event created by the command; and a server communication unit for transmitting the non-real-time message among the game messages associated with the event to the first server, transmitting the real-time message to the second server, receiving the game messages associated with the event from at least one of the first server and the second server, and transmitting the received game messages to the game logic processor.

It is to be understood that both the foregoing general description and the following detailed description are exemplary and explanatory and are intended to provide further explanation of the invention as claimed.

BRIEF DESCRIPTION OF THE DRAWINGS

The above and other features of the embodiments exemplarily described herein will become more apparent after reading the following detailed description when taken in conjunction with the drawings, in which.

DETAILED DESCRIPTION

Now, exemplary embodiments will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the embodiments rather unclear.

A system and method for controlling a traffic car for use in a multi-access online game according to some embodiments will hereinafter be described in detail.

The embodiments exemplarily described herein can be applied to a variety of multi-access online games. Specifically, the effects of the embodiments exemplarily described herein can be maximized in the case of a multi-access online role-playing game in which a fast moving player character moves to transmit a plurality of messages.

For the convenience of description and better understanding, an exemplary case in which the above-mentioned system is applied to the multi-access online role-playing racing game will hereinafter be described in detail. However, it should be noted that the scope and spirit of the present invention, as defined by the claims, is not applied to only the above-mentioned example, but can also be applied to a multi-access online role-playing racing game as well as a variety of multi-access online games capable of enabling player characters to exchange their status information with each other.

Figure 1:
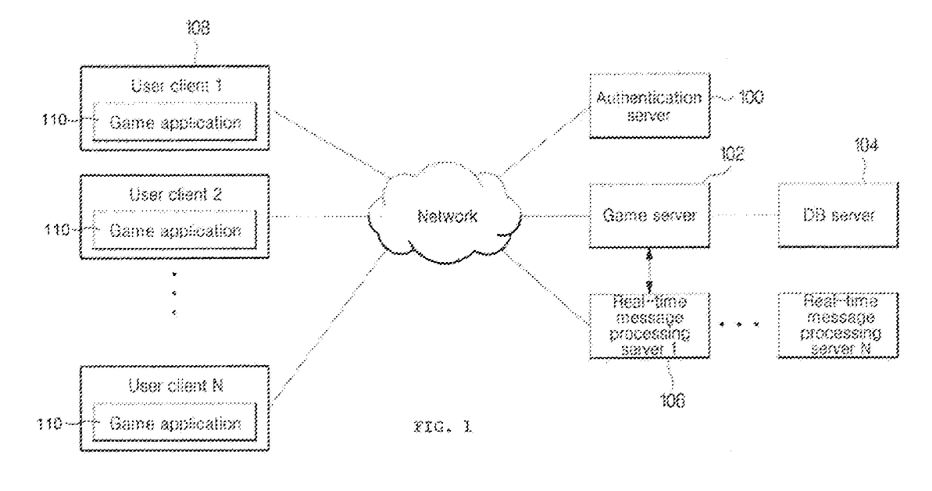
FIG. 1 is a block diagram illustrating a multi-access online game system according to one embodiment.

FIG. 1 is a block diagram illustrating a multi-access online game system according to one embodiment.

Referring to FIG. 1, the multi-access online game system according to one embodiment may include an authentication server 100, a game server 102, a database (DB) server 104, and a plurality of real-time message processing servers 106.

The multi-access online game system is connected to a user client 108 over a network.

In this case, the network may be indicative of an Internet, a wire network including a dedicated line, and other wireless networks including a wireless Internet, a mobile communication network, and a satellite communication network.

The user client 108 connected to the network is indicative of a plurality of terminal units, each of which includes a game application 110 capable of receiving a multi-access online game service over the network. For example, the user client 108 may include a desktop PC, a notebook computer, a mobile phone, a PDA, and a mobile broadcast system (MBS), etc.

The authentication server 100 receives a log-in request (i.e., an authentication request) from the user client 108, and authenticates whether a user who desires to access the game system is an authorized user who has the authority of accessing the game system. In other words, the authentication server 100 receives authentication request information from the user client 108, and determines whether the authentication request of the user client 108 is valid or not. The log-in request information may, for example, include a user ID and a password, and the authentication server 100 determines whether the ID and password contained in the log-in request information is valid or not.

In order to determine whether the ID and password of the user is valid, the authentication server 100 may communicate with the DB server 104, or may communicate with other DBs (not shown) storing authentication-associated information.

In order to perform the aforementioned authentication between the user client 108 and the authentication server 100, not only the above-mentioned authentication based on the ID/password information, but also a variety of authentication methods well known to those skilled in the art, can also be employed.

When the authentication is completed, the user client 108 gains access to the game server 102.

The game server 102 processes game messages of the user client 108, and controls the progression of the game. The game server 102 receives a variety of game-associated event messages, for example, game command messages such as attack or moving messages of player characters, chatting messages between user clients 108, quest messages such as quest-acceptance or completion of Non Player Character (NPC), and status information messages such as level-up or item acquisition of the player characters, so that the game server 102 conducts the received game-associated event messages according to a predetermined game logic.

For example, upon receiving the status information message such as the level-up message of each player, the game server 102 transmits the level-up information of the user to the DB server 104, so that it updates level information of the corresponding user with new information. Upon receiving the quest-acceptance or completion of the user, the game server 102 stores the received messages in the DB server 104.

Specifically, the game server 102 transmits event information created by a specific user to other user clients, so that a plurality of users can share a variety of events (e.g., status change messages of the player characters) encountered during the game with each other.

According to one embodiment, information messages (e.g., character status information such as a character level-up or quest information) having the low necessity of being real-time transmitted to peripheral user characters, but which must be stored in the DB server 104, are processed by the game server 102.

In the meantime, during the racing game, the game server 102 may control the NPC or a traffic car serving as an obstructive matter in the game.

The multi-access online game system of FIG. 1 includes a plurality of real-time message processing servers 106. The real-time message processing server 106 wholly processes real-time messages from among messages transmitted from the user client 108.

In the case of the racing game in which the character car moves fast and the collision between the character cars frequently occurs, the moving or collision messages between the player characters must be processed in real time.

Provided that the real-time message such as the moving message is processed by the game server 102, event messages must be transmitted to N user clients for only one player character, so that the amount of load unavoidably increases.

Therefore, the multi-access online game system of FIG. 1 further includes the real-time message processing server 106 separated from the game server 102, so that it receives the real-time messages such as the moving or collision messages of the player characters and transmits the received real-time messages to other user clients using the real-time message processing server 106.

The real-time message processing server 106 may receive/transmit the real-time messages, and may determine the presence or absence of a player character located within a predetermined distance from the other player character which has transmitted the moving or collision messages.

For example, in the case where the moving message of the first player is transmitted to the real-time message processing server 106, the real-time message processing server 106 determines the presence or absence of other player characters located within a predetermined distance from the first player character, which has generated the event, using location information of individual player characters, and selectively transmits the moving information of the first player character to only the user client 108 of the corresponding character.

Therefore, the amount of system load is lower than that of the other case in which the moving information of the player character is unconditionally transmitted to other user clients.

The above-mentioned processes may be equally applied to not only the moving messages but also chatting messages transmitted to other users who exist in the same space.

In the meantime, the real-time message processing server 106 may be a dedicated server for wholly controlling sub-areas created by division of the game space. The number of the real-time message processing servers may be equal to the number of sub-areas indicating the divided areas.

In this case, the game application 110 installed into the user client 108 may transmit real-time messages to the real-time message processing server 106 controlling the area to which the user's player character belongs.

The DB server 104 stores information associated with the game and provides the stored information to the game server 102 or the user client 108 according to a request of the game server 102 or the user client 108.

The DB server 104 may store status information of player characters, item information, and quest information, etc. If the DB server 104 receives character status-, item-, and quest-information from the game server 102, it stores corresponding information.

Figure 2:
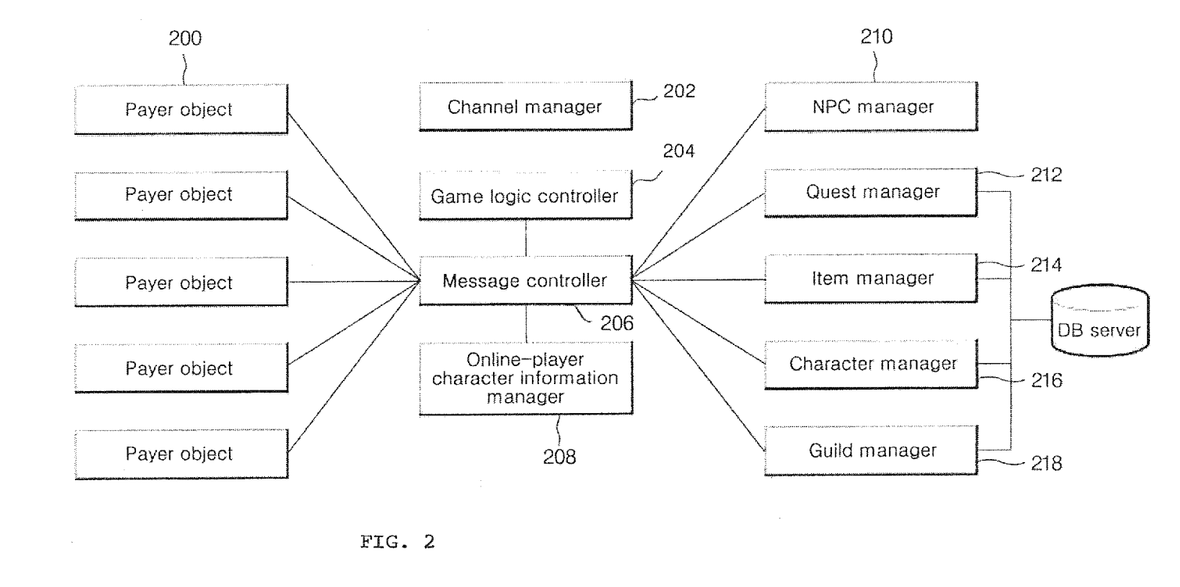
FIG. 2 is a block diagram illustrating modules of a game server according to one embodiment.

FIG. 2 is a block diagram illustrating modules of the game server according to one embodiment.

Referring to FIG. 2, the game server 102 according to one embodiment may include a plurality of player objects 200, a channel manager 202, a game logic controller 204, a message controller 206, an online-player character information manager 208, an NPC manager 210, a quest manager 212, an item manager 214, a character manager 216, and a guild manager 218.

The player object 200 controls transmission/reception of messages between user clients 108 accessing the game server 102. A player object 200 is created when a user client 108 gains access to the game server 102 and the player object 200 disappears when the connection between the game server 102 and the user client 108 is severed.

The player object 200 transmits game messages received from the user client 108 to the message controller 206. Upon receiving the game messages of the game server 102 from the message controller 206, the player object 200 transmits the received game messages to the corresponding user client 108.

The channel manager 202 manages a variety of game areas for the racing game. In this case, the game areas may be indicative of several areas capable of being distinguished from each other, for example, a quest-execution area, a racing area, and a store area.

The game logic controller 204 performs a variety of control processes required for the game. For example, the game logic controller 204 determines whether a quest of a player character of the game is completed, or determines the winner of the race.

The game logic controller 204 may control the traffic cars on the game.

In the case of controlling the traffic car, the game logic controller 204 calculates moving information to accelerate or decelerate the traffic car, processes signals to smoothly drive the traffic car at the bottleneck point, and processes signals to change a current lane of the traffic car to another lane.

The message controller 206 receives game-associated messages created by the user client 108 from the player object 200, and distributes the received messages to constituent components which will deal with the received message.

For example, if a wearing-item change message of a specific user character is received from the player object 200, the message controller 206 transmits the received wearing-item change message to the item manager 204 and the character manager 206. If the received message is a quest acceptance message of a specific user, the message controller 206 transmits a quest acceptance message to the quest manager 212.

If the message controller 206 desires to transmit a message to the accessed user client 108, it transmits the corresponding message to the player object 200 associated with the corresponding user client 108.

For example, if the chatting message for a specific user is received in the message controller 206, the message controller 206 transmits the chatting message to the player object 200 associated with a receiving user who receives the chatting message, so that the chatting message can be transmitted to the corresponding user client 108.

The online-player character information manager 208 manages information of online user characters who access the game server 102. The player character information may include detailed information of the online-player characters, for example, ID-, location-, level-, and item-information of the online-player characters.

The information of the online-player character information manager 208 is used when the message controller 206 determines information of a message receiver. For example, if a specific user changes a current character-wearing item to another item, the wearing-item change information must be transmitted to peripheral users other than the specific user.

In this case, the message controller 206 extracts peripheral player characters other than the specific player character, who has changed the wearing item to another item, using the information managed by the online-player character information manager 208, and transmits a wearing-item change message to the player objects 200 of the corresponding player characters.

If the message controller 206 receives status change messages (e.g., moving messages, wearing-item change messages, and collision messages) of a specific player character, it transmits the status change information to the online-player character information manager 208, such that the status information of the online-mode character is managed by the online-player character information manager 208.

The NPC (Non Player Character) manager 210 manages NPC information appearing in the game. For example, in the case of the racing game, the NPC manager 210 manages NPC information for quest provision, and information of any traffic car appearing in the game.

The quest manager 212 manages quest information provided to users in the multi-access online game, and also manages quest acceptance- or quest completion-information.

If a specific user accepts a specific quest the quest acceptance message is transmitted to the message controller 206, and the message controller 206 transmits the quest acceptance message to the quest manager 212.

The quest manager 212 transmits the quest acceptance information to the DB server 104, so that the quest acceptance information is reflected in the DB server 104. In the case of the quest completion message, the quest completion message is reflected in the DB server 104 by the quest manager 212 in the same manner as in the above quest acceptance message.

The item manager 214 manages not only information of items created during the game, but also user-character item change information (e.g., item acquisition or item drop) of the user character.

If a specific player character acquires the item, the item acquisition message is transmitted to the message controller 206, and the message controller 206 transmits the item acquisition message to the item manager 204. The item manager 204 transmits the item acquisition information to the DB server 104, so that the item acquisition information can be reflected in the DB server 104.

The character manager 216 manages information of characters created by the users, receives status-change messages of the characters, and transmits the received status-change messages (e.g., a character level-up message and item acquisition information) to the DB server 104.

The guild manager 218 manages information of a guild created by the multi-access online game users. The guild manager 218 receives guild-associated messages, for example, subscription/withdrawal messages of guild members and level-change messages of the guild members. And, the guild manager 218 transmits the guild-associated information contained in the received message to the DB server 104. If there is guild-associated quest information such as a guild-member status or guild-member name, the guild manager 218 communicates with the DB server 104 to provide guild information.

Figure 3:
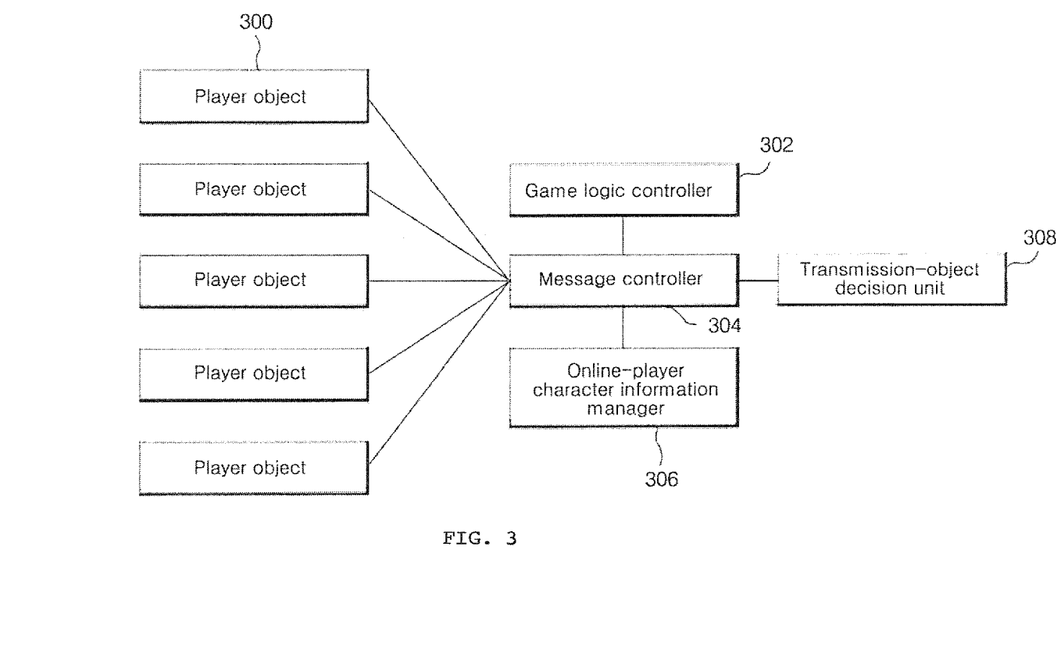
FIG. 3 is a block diagram illustrating a real-time message processing server according to one embodiment.

FIG. 3 is a block diagram illustrating the real-time message processing server according to one embodiment.

Referring to FIG. 3, the real-time message processing server 106 according to one embodiment may include a player object 300, a game logic controller 302, a message controller 304, an online-player character information manager 306, and a transmission-object decision unit 308.

As stated above, the real-time message processing server 106 is adapted to share roles of the game server 102, and conducts messages (e.g., collision messages or real-time chatting messages) needed to be immediately transmitted to a destination.

Therefore, the real-time message processing server 106 may include some parts of constituent components of the game server 102. However, the real-time message processing server 106 does not include the quest manager 212, the item manager 214, the character manager 216, and the guild manager 218, which are needed to communicate with the DB server 104.

The player object 300, the message controller 304, and the game logic controller 302, and the online-player character information manager 306 shown in FIG. 3 are the same as those of the game server shown in FIG. 2, so that their detailed description will herein be omitted for the convenience of description.

In one embodiment, if a variety of events (e.g., a moving event, a collision event, and a chatting-message creation event) occur about each player character during the racing game, the game application 110 installed into the user client 108 determines whether the generated event is a real-time event. If it is determined that the generated event must be conducted in real time, the game application 110 generates the real-time message, and transmits the real-time message to the real-time message processing server 106.

In this case, the real-time message may include an ID of a player character who has transmitted the real-time message, and event content information, etc.

In one embodiment if the above-mentioned real-time message is received from a specific player character, the transmission-object decision unit 308 determines the presence or absence of at least one player character located within a predetermined distance from the specific player character using location information of online-mode player characters transmitted from the online-player character information manager 306.

In this case, although the real-time message processing server 106 may include the online-player character information manager 306, it should be noted that the real-time message processing server 106 may receive location information of each player character from the online-player character information manager 208 contained in the game server 102 only when the object (hereinafter referred to as "transmission objects") to which the message is transmitted is decided.

As described above, the transmission object can be decided by the transmission-object decision unit 308 for determining the presence or absence of other player characters located within a predetermined distance from the player character which has generated the event. For example, a player character existing in the 100×100 area on the basis of the location of the player character which has generated the event may be determined to be the transmission object.

The message controller 304 transmits the real-time message to the player object 300 corresponding to the player character determined to be the transmission object. The player object 300 transmits the real-time message associated with a specific player character to the associated user client 108.

Figure 4:
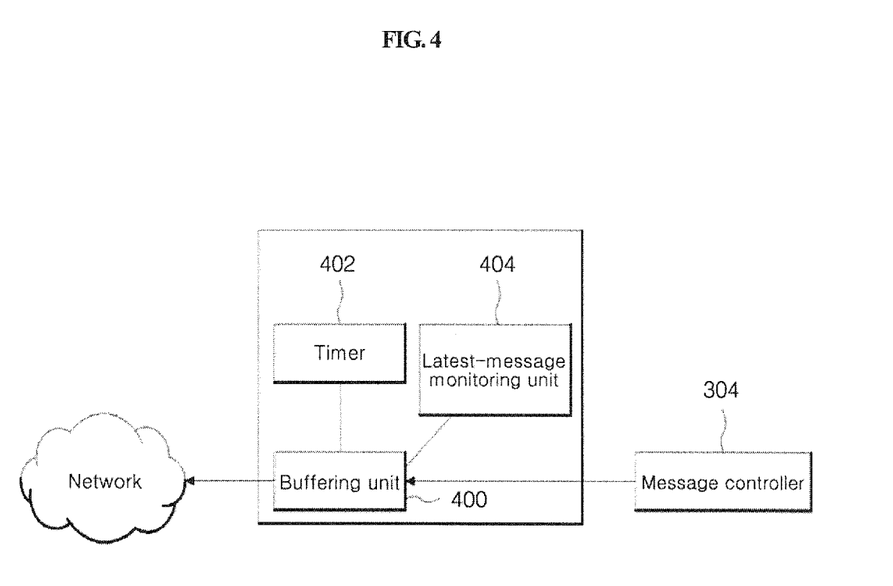
FIG. 4 is a detailed block diagram illustrating a player object according to one embodiment.

FIG. 4 is a detailed block diagram illustrating the player object 300 according to one embodiment.

Referring to FIG. 4, the player object 300 may include a buffering unit 400, a timer 402, and a latest-message monitoring unit 404.

The buffering unit 400 performs buffering of the message transmitted from the message controller 304.

The buffered message is transmitted to the user client 108 associated with the player object 300.

As stated above, the messages needed to be immediately transmitted to a destination frequently occur in the racing game. Accordingly, if the buffered message is not transmitted to the destination in real time due to the problems of network environments, the buffered message may be discarded.

For this purpose, the timer 402 determines whether a predetermined time has expired. If the predetermined time has expired, the message temporarily stored in the buffering unit 400 is discarded.

The latest-message monitoring unit 404 transmits only the latest real-time message associated with a specific player character to the user client 108.

In one embodiment the moving message associated with the specific player character is continuously buffered by the buffering unit 400. The latest-message monitoring unit 404 determines the presence or absence of a previous moving message of the corresponding player character in the buffering unit 400 at a transmission time of the moving message associated with the specific player character. If the presence of the previous moving message exists, the latest-message monitoring unit 404 overwrites the previous moving message with the latest moving message.

As described above, the player object 300 allows the real-time message to maintain the latest-message status, so that the user can correctly recognize the movement of other player characters of the racing game on the basis of the latest real-time message.

Figure 5:
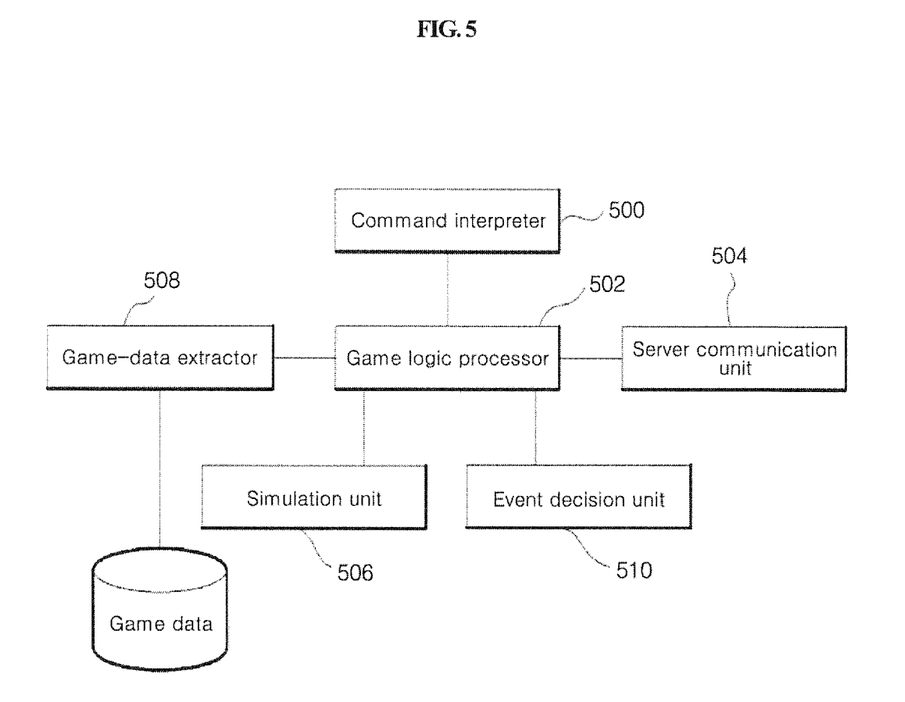
FIG. 5 is a detailed block diagram illustrating a game application according to one embodiment.

FIG. 5 is a detailed block diagram illustrating the game application installed into the user client according to one embodiment.

Referring to FIG. 5, the game application according to the one embodiment may include a command interpreter 500, a game logic processor 502, a server communication unit 504, a simulation unit 506, a game-data extractor 508, and an event decision unit 510.

The command interpreter 500 receives game command information inputted by the user, interprets the game command, and transmits the interpreted information to the game logic processor 502. For example, the game command interpreter 500 determines whether the user-entry game command is a quest acceptance command or a moving command, and transmits the determined information to the game logic processor 502.

The game logic processor 502 executes a predetermined game logic according to the game command inputted by the user.

If the game command has no need to be transmitted to the servers 102 and 106 as the game environment setup command, the game logic processor 502 conducts a game environment setup process in the client.

If the game command is determined to be a specific command needed to be transmitted to the servers 102 and 106 as the moving message of the player character, the game logic processor 502 creates a moving message corresponding to the moving command, and transmits the moving message to the server communication unit 504.

The server communication unit 504 transmits the game message created from the game logic processor 502 to the game server 102 or the real-time message processing server 106. And, the server communication unit 504 transmits the game message transmitted from the real-time message processing server 106 to the game logic processor 502.

According to some embodiments, the server communication unit 504 is connected to the game server 102 and several real-time message processing servers 106, and at the same time transmits a message to one of the servers 102 and 106 according to event categories indicating whether the event is a real-time event or non-real-time event.

The simulation unit 506 performs simulation associated with a player character of a user and player characters of other users. Upon receiving moving information of the traffic car, the simulation unit 506 performs simulation associated with the traffic car according to the received moving information.

The game data extractor 508 extracts game data needed to execute the game. For example, upon receiving a control signal of the game logic processor 502, the game data extractor 508 extracts map data and character information data.

The event decision unit 510 determines whether the event created by the user command is the real-time event or the non-real-time event.

According to some embodiments, category information of the real-time event may be predetermined, and the event decision unit 510 determines whether the event created by the user is contained in the aforementioned predetermined event.

If the event is determined to be the real-time event, the game logic processor 502 generates the real-time message, and the server communication unit 504 transmits the real-time message to the real-time message processing server

106. In this case, the real-time message includes an identifier (ID) of the player character, event content, and real-time event identifier (ID).

In this case, the real-time message processing server 106 may be composed of several servers 106, so that the server communication unit 504 searches for a specific server 106 having a small amount of load from among the several servers 106, and transmits the real-time message to the retrieved server 106.

In a modified embodiment, the server communication unit 504 may transmit the real-time message to the real-time message processing server 106 controlling a specific area including the user's player character.

Figure 6:
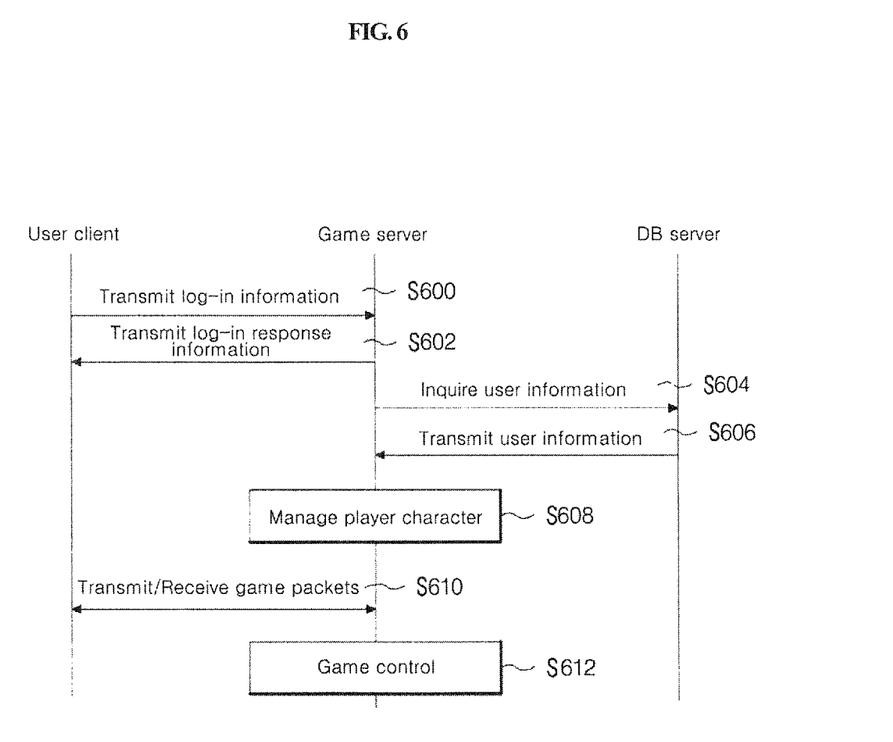
FIG. 6 is a flow chart illustrating a channel-entrance processing step according to one embodiment.

FIG. 6 is a flow chart illustrating a channel-entrance processing step according to one embodiment.

Referring to FIG. 6, the user client 108 transmits log-in information to the game server 102 at step S600.

In this case, the log-in information may include a user ID and a password. The game server 102 authenticates the user by interacting with the authentication server 100, and transmits the log-in response information to the user client 108 at step S602.

If the log-in process is completed, the game server 102 queries the DB server 104 for user information at step S604. The DB server 104 transmits the requested user information to the game server 102 at step S606.

In this case, the user information may include player character information, quest-associated information, item information, and guild information, etc.

The user information is managed by the online-player character information manager 208 of the game server 102 at step S608.

Thereafter, the user client 108 and the game server 102 perform transmission/reception of game packets according to the user command at step S610.

The game server 102 performs control operations associated with the game logic using the game packets transmitted to the user client 108 at step S612. In this case, the game control operations may include an operation for transmitting the game packets to other players, an operation for transmitting simulation information created by the moving- or collision-message, and an operation for transmitting the moving information associated with the traffic car.

Figure 7:
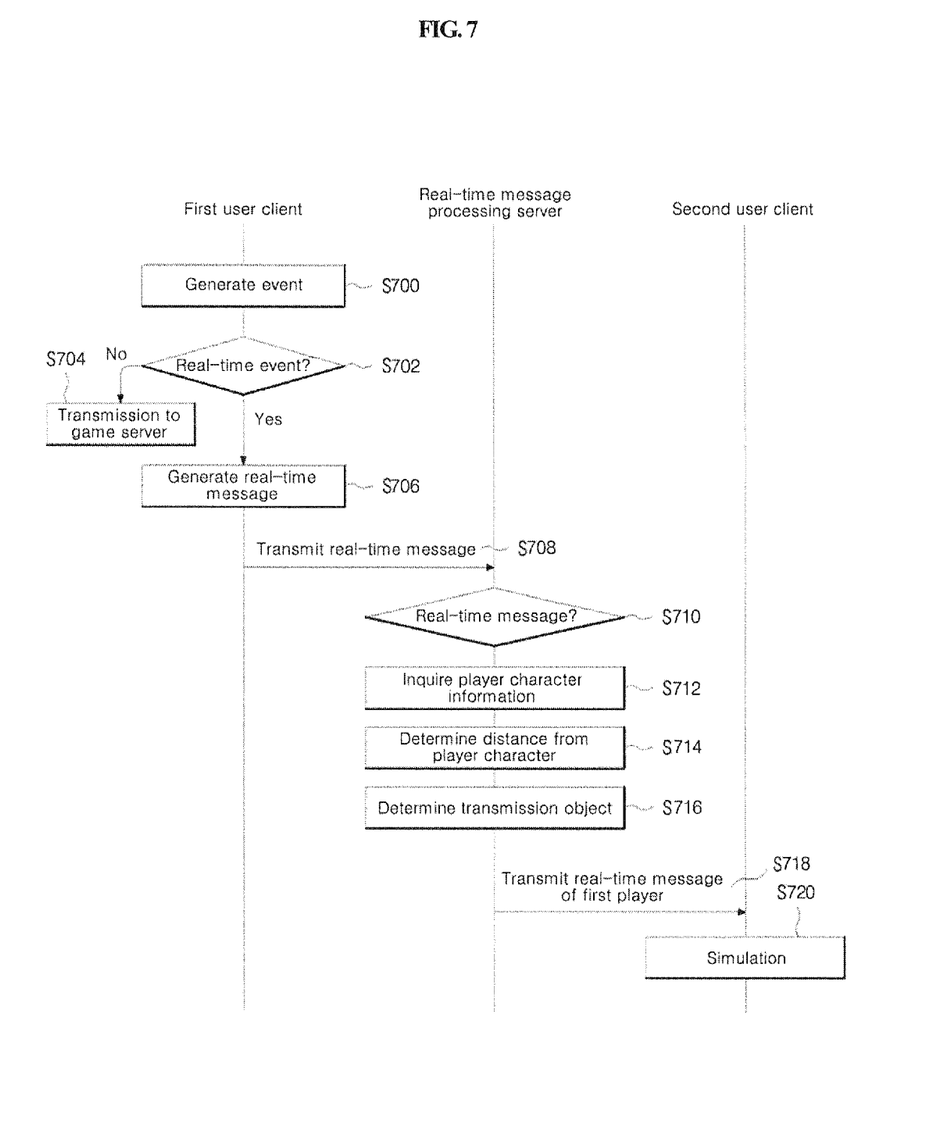
FIG. 7 is a flow chart illustrating a method for processing a real-time message according to one embodiment.

FIG. 7 is a flow chart illustrating a method for processing the real-time message according to one embodiment.

Referring to FIG. 7, if the event is generated by the user command at step S700, the game application 110 installed into the user client 108 determines whether the corresponding event is the real-time event or not at step S702.

If the corresponding event is not the real-time event at step S702, the message corresponding to the corresponding event is transmitted to the game server 102 at step S704. Otherwise, if the corresponding event is the real-time event at step S702, the game application 110 generates the real-time message at step S706.

The generated real-time message is transmitted to the real-time message processing server 106 at step S708.

The real-time message processing server 106 determines whether the transmitted message is the real-time message at step S710, so that it can be recognized that the transmitted message is controlled by only the real-time message processing server 106. If necessary, the determining step S710 may be omitted.

If it is determined that the transmitted message is the real-time message at step S710, the real-time message processing server 106 inquires about information of online-mode player characters at step S712.

In one embodiment, the real-time message processing server 106 may inquire about location information of individual player characters existing in the same channel or world.

Thereafter, the real-time message processing server 106 determines the distance between the player character, who has transmitted the real-time message, and the other player character, who has inquired at step S712, at step S714, and determines the transmission object of the message on the basis of the determined distance at step S716.

As described above, the transmission object may be determined to be a specific player character existing within a predetermined area from among several player characters according to the location information of the player character who has transmitted the message and other player characters.

The real-time message processing server 106 transmits the real-time message of the first player character to the user client acting as the transmission object at step S718.

Thereafter, if the real-time message is the moving message, the game application 110 installed into the user client receiving the real-time message of the first player character performs the simulation associated with the first player character, and displays the simulation result on the screen at step S720.

Figure 8:
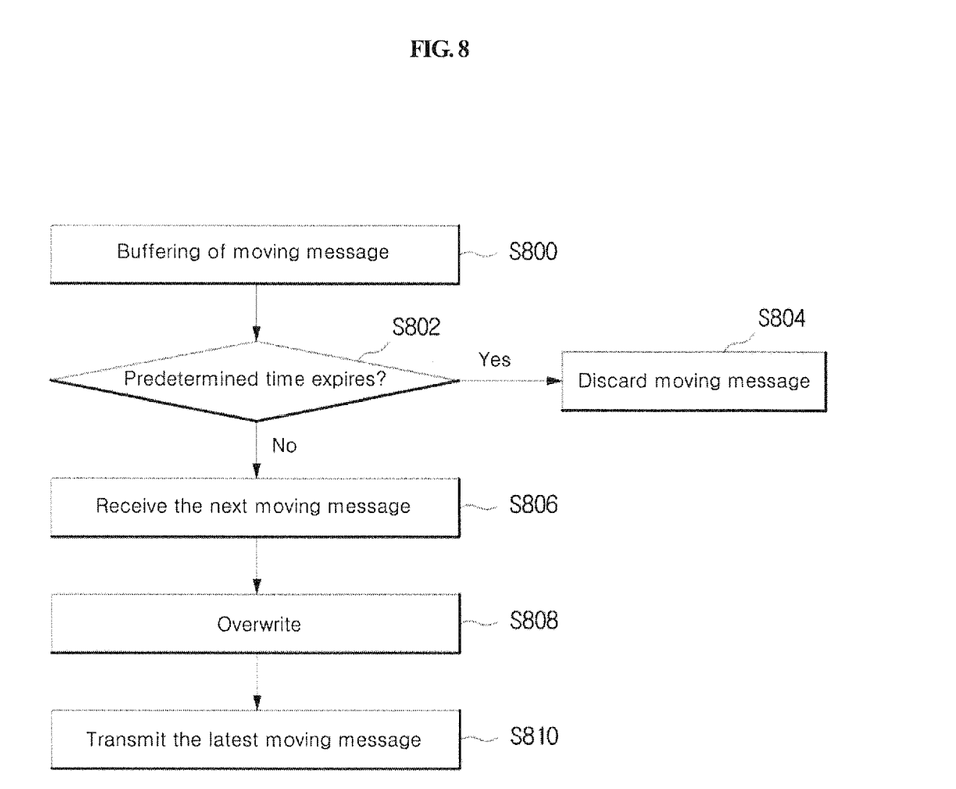
FIG. 8 is a flow chart illustrating a method for transmitting moving messages according to one embodiment.

FIG. 8 is a flow chart illustrating a method for transmitting moving messages according to one embodiment.

In more detail, FIG. 8 shows a method for transmitting the moving messages of other player characters from among real-time messages in the player object contained in the real-time message processing server 106.

Referring to FIG. 8, the buffering unit 400 of the player object receives the moving messages associated with the specific player character from the message controller 304, and performs buffering of the received moving messages at step S800.

If the moving messages are completely buffered at step S800, the timer 402 determines whether a predetermined time expires at step S802. If the predetermined time has expired at step S802, non-transmission moving messages are discarded at step S804.

The non-transmission moving messages may be discarded on the condition that the message is not transmitted to a destination in real time due to the problems of network environments.

In the meantime, upon receiving the next moving message of the aforementioned player character before the predetermined time expires at step S806, the latest-message monitoring unit 404 determines the presence or absence of the previous moving message, and overwrites the previous moving message with the next moving message if the presence of the previous moving message is determined at step S808.

The next moving message overwritten is transmitted as the latest moving message to the user client 108 at step S810.

It should be noted that most terminology disclosed herein is defined in consideration of functions of the embodiments exemplarily described herein, and can be differently determined according to intention of those skilled in the art or usual practices. Therefore, the above-mentioned terminology should be understood on the basis of all the content disclosed herein.

It will be apparent to those skilled in the art that various modifications and variations can be made in the embodiments exemplarily described herein without departing from the spirit or scope of the inventions as claimed. Thus, it is intended that modifications and variations of the embodiments exemplarily described herein are covered, provided they come within the scope of the appended claims and their equivalents.

As apparent from the above description, the multi-access online game system and the game control method for use in the same allow a distributed server to control messages (i.e., real-time messages) needed to be processed in real time, so that an amount of server load can be reduced.

The multi-access online game system exemplarily described above selectively transmits the real-time message to only some players from among online players by the multi-access online game system, so that an amount of transmission load of the server can be reduced.

The multi-access online game system exemplarily described above allows the user to determine whether the message is the real-time message, and transmits the real-time message to a server different from the game server, so that the amount of load of the game server can be reduced.

What is claimed is:

1. A computer-implemented game control method to manage a multi-access online game system for a multi-access online game, which comprises at least one user client, a first server, and at least one second server, the method comprising:
   the first user client comprising a processor configured for:
      receiving a game-associated event message during play of the multi-access online game on the first user client;
      determining whether the game-associated event message is a real-time message that requires immediate transmission to a second user client based on an event category of the game-associated event message;
      sending the game-associated event message to the first server when the game-associated event message is determined not to be the real-time message; and
      sending the game-associated event message directly to the at least one second server when the game-associated event message is determined to be the real-time message; and
   the at least one second server comprising a processor configured for selectively transmitting the real-time message to only some players from among online players of the multi-access online game by:
      determining the second user client where the real-time message is to be received; and
      transmitting the real-time message to the second user client,
      wherein the determining of the second user client comprises:
         recognizing location information, on the multi-access online game, of a first player character corresponding to the first user client; and
         upon recognizing the location information of the first player character, determining a user client corresponding to a second player character, existing within a predetermined distance from the first player character, to be the second user client.

2. The method according to claim 1, wherein the determining whether the game-associated event message is the real-time message is decided by a game application of the multi-access online game installed into the first user client.

3. The method according to claim 1, wherein the real-time message comprises at least one of a moving message of a player character, a collision message, and a chatting message for another user adjacent to the player character.

4. The method according to claim 1, further comprising:
   before transmitting the real-time message to the second user client, buffering the real-time message;
   determining whether a predetermined time expires after the buffering the real-time message; and
   when the predetermined time expires, discarding the buffered real-time message.

5. The method according to claim 4, further comprising:
   upon receiving a next real-time message from the first user client, overwriting the buffered real-time message with the next real-time message.

6. The method according to claim 1, wherein a number of the at least one second server is equal to a number of divided areas of a game space.

7. A non-transitory computer-readable storage medium comprising an executable program, which when executed, causes performance of the following steps:
   receiving a game-associated event message generated during play of a multi-access online game on a first user client as a real-time message based on an event category of the game-associated event message; and
   selectively transmitting the real-time message to only some players from among online players of the multi-access online game by:
      determining a second user client where the real-time message is to be received; and
      transmitting the real-time message to the second user client,
   wherein the determining of the second user client comprises:
      recognizing location information, on the multi-access online game, of a first player character corresponding to the first user client; and
      upon recognizing the location information of the first player character, determining a user client corresponding to a second player character, existing within a predetermined distance from the first player character, to be the second user client.

8. A game control method that employs a game application installed into at least one user client which gains access to a multi-access online game system including a first server and at least one second server to play a game, the method comprising:
   a first user client comprising a processor configured for:
   receiving game command information during play of the game;
   determining whether an event created by the received game command is a real-time event that requires immediate notice based on an event category of the game-associated event message;
   generating a real-time message with respect to the real-time event, and transmitting the generated real-time message directly to any one of the at least one second server when the event is determined to be the real-time event; and
   alternatively transmitting a message associated with the event to the first server when the event is determined not to be the real-time event; and
   the at least one second server comprising a processor configured for selectively transmitting the real-time message to only some players from among online players of the multi-access online game by:
      determining a second user client where the real-time message is to be transmitted; and
      transmitting the real-time message to a game application to the second user client, wherein the determining of the second user client comprises:
  recognizing location information, on the game, of a first player character corresponding to the first user client; and
  upon recognizing the location information of the first player character, determining a user client corresponding to a second player character, existing within a predetermined distance from the first player character, to be the second user client.

9. The method according to claim 8, wherein
a number of the at least one second server is equal to a number of divided areas of a game space, and
the game application of the first user client transmits real-time messages to the second server controlling an area including a player character running on the first user client.

10. A multi-access online game system for controlling a game of player characters corresponding to a plurality of user clients comprising:
  a first user client comprising a processor configured to receive a game-associated event message during play of a multi-access online game, determine whether the game-associated event message is a real-time message that requires immediate notice to a second user client based on an event category of the game-associated event message, sending the game-associated event message to the one of a game server and at least one distributed server according to a game logic;
  the game server configured to receive event messages associated with a game from a first user client, and configured to process the received game-associated event messages according to the game logic;
  a database server configured to receive status change information comprising status change information of each player character from the game server, and configured to store the received status change information in a database; and
  the at least one distributed server configured to receive a real-time message among the game-associated event messages from the first user client, configured to selectively transmit the real-time message to only some players from among online players of the multi-access online, configured to determine the second user client where the real-time message is to be received, and configured to transmit the real-time message to the second user client,
  wherein it is determined whether a message from the first user client is the real-time message that requires immediate transmission to the second user client, and the message is sent to the game server when the message is determined not to be the real-time message, or is alternatively sent directly to the at least one distributed server when the message is determined to be the real-time message, and
  wherein the determining of the second user client, by the at least one distributed server, comprises recognizing location information, on the game, of a first player character corresponding to the first user client, and upon recognizing the location information of the first player character, determining a user client corresponding to a second player character, existing within a predetermined distance from the first player character, to be the second user client.

11. The system according to claim 10, wherein whether the message is the real-time message is decided by a game application installed at the first user client.

12. The system according to claim 10, wherein:
  when the game is a multi-access online game, the real-time message comprises at least one of a moving message of a player character, a collision message, and a chatting message for another user adjacent to the player character.

13. The system according to claim 10, wherein the at least one distributed server is configured to render a player object which appears or disappears for each accessing user client, and to transmit/receive the real-time message to/from the accessing user client,
  wherein the at least one distributed server comprises;
  a transmission-object decision unit configured to determine the second user client where the real-time message is to be transmitted; and
  an online-player character information manager configured to manage location information of player characters, that exist in an online status, to determine a transmission object.

14. The system according to claim 13, wherein the transmission-object decision unit receives the location information from the online-player character information manager, and determines a user client corresponding to a player character existing within a predetermined distance from a player character corresponding to the first user client to be the second user client on the basis of the received location information.

15. The system according to claim 13, wherein the player object buffers the real-time message to be transmitted to the second user client, receives a next real-time message from the first user client, and overwrites the buffered real-time message with the next real-time message.

* * * * *